United States Patent
Ramme et al.

(10) Patent No.: US 7,217,401 B2
(45) Date of Patent: May 15, 2007

(54) MERCURY REMOVAL FROM ACTIVATED CARBON AND/OR FLY ASH

(75) Inventors: Bruce W. Ramme, Okauchee, WI (US); Terry L. Coughlin, Saukville, WI (US); Bryna D. Goeckner, Whitefish Bay, WI (US); Bryan C. Fisher, Kennesaw, GA (US); John J. Noegel, Grafton, WI (US)

(73) Assignee: Wisconsin Electric Power Company, Milwaukee, WI (US)

( * ) Notice: Subject to any disclaimer, the term of this patent is extended or adjusted under 35 U.S.C. 154(b) by 0 days.

(21) Appl. No.: 10/717,293

(22) Filed: Nov. 19, 2003

(65) Prior Publication Data

US 2005/0075236 A1   Apr. 7, 2005

Related U.S. Application Data

(63) Continuation-in-part of application No. 09/807,643, filed as application No. PCT/US00/22398 on Aug. 15, 2000, now Pat. No. 6,755,901.

(60) Provisional application No. 60/149,295, filed on Aug. 17, 1999.

(51) Int. Cl.
*B01D 47/00* (2006.01)

(52) U.S. Cl. .......................... 423/210; 502/38; 502/39; 502/41

(58) Field of Classification Search ................. 502/38, 502/39, 41; 423/210; 95/901
See application file for complete search history.

(56) References Cited

U.S. PATENT DOCUMENTS

| 3,284,317 | A | * | 11/1966 | Jahnig et al. ................. 201/17 |
| 3,664,935 | A | * | 5/1972 | Johnson ....................... 205/393 |
| 4,619,531 | A | * | 10/1986 | Dunstan ......................... 366/3 |
| 4,911,900 | A |   | 3/1990 | Horch et al. |

(Continued)

FOREIGN PATENT DOCUMENTS

DE   3425070   1/1986

(Continued)

OTHER PUBLICATIONS

RD 470003, Jun. 2003.*

(Continued)

*Primary Examiner*—Paul Marcantoni
(74) *Attorney, Agent, or Firm*—Quarles & Brady LLP

(57) ABSTRACT

A method for reducing the amount of mercury affixed to a sorbent and/or fly ash is disclosed. The method includes the steps of providing an amount of sorbent and/or fly ash wherein at least a portion of the amount of sorbent and/or fly ash has particulates having mercury compounds affixed to the particulates; and exposing the amount of sorbent and/or fly ash to heated flowing air until mercury compounds are liberated from at least some of the particulates. Preferably, the amount of sorbent and/or fly ash is maintained in the heated flowing air until the sorbent reaches a temperature of at least 700° F. (372° C.). When the sorbent is activated carbon, it is preferred that the amount of sorbent and/or fly ash is maintained in the heated flowing air until the activated carbon reaches a temperature in the range of 700° F. (372° C.) to 1000° F. (538° C.).

15 Claims, 4 Drawing Sheets

U.S. PATENT DOCUMENTS

| | | | |
|---|---|---|---|
| 5,160,539 | A | 11/1992 | Cochran |
| 5,245,120 | A * | 9/1993 | Srinivasachar et al. ..... 588/256 |
| 5,280,701 | A * | 1/1994 | Tolman ...................... 210/180 |
| 5,556,447 | A * | 9/1996 | Srinivasachar et al. ....... 75/670 |
| 5,803,663 | A * | 9/1998 | Matsuyama et al. ........ 405/128 |
| 5,837,052 | A | 11/1998 | Oates et al. |
| 6,399,851 | B1 * | 6/2002 | Siddle ........................ 588/228 |
| 6,416,567 | B1 * | 7/2002 | Edlund et al. ................ 75/670 |

FOREIGN PATENT DOCUMENTS

| | | | |
|---|---|---|---|
| DE | 3526756 | | 1/1987 |
| DE | 3708941 | | 9/1988 |
| DE | 3732026 | | 4/1989 |
| DE | 3802884 | | 10/1989 |
| DE | 19801321 | * | 7/1999 |
| EP | 380467 | * | 8/1990 |
| JP | 04061981 | * | 2/1992 |
| JP | 07155722 | * | 6/1995 |
| JP | 07155723 | * | 6/1995 |
| JP | 2003154233 | * | 5/2003 |
| WO | 94/08892 | | 4/1994 |
| WO | 01/12268 | | 2/2001 |

OTHER PUBLICATIONS

"Regeneration of activated carbon used in hte adsorption of mercury and organomercury compounds in waster gases", Zemskov et al. Zhurnal Pirkladnoi Khimii (Saint Peterburg, Russian Federation) 1960, 33, 1222-4.*

Answer 7 or 8 of Chemical Abstracts STN□□"Effluent filtering process and apparatus for an aluminum reduction cell" Johnson □□US Patent 3,6664,935 abstract only.*

Answer 4 of 8 of Chemical Abstracts STN□□"Pneumatic chute for the horizontal transport of powdered bulks" Stegmaier, Journal of Powder and Bulk Solids Technology (1978), 2(1), 47-55. Abstract only.*

PCT Search Report for PCT/US00/22398.

English Language Translation of DE 3802884.

English Language Translation of DE 3526756.

English Language Abstract for DE 3425070.

English Language Abstract for DE 3732026.

English Language Abstract for DE 3708941.

Patent Abstract for Japanese Publication No. 55054075 published Apr. 21, 1980.

"Adsorption of Elemental Mercury by Virgin and Impregnated Activated Carbon" in "Environmental Separation of Heavy Metals", CRC Press, pp. 15-44, 2001.

Chang and Owens, "Developing Mercury Removal Methods for Power Plants", EPRI Journal, vol. 19, No. 5, pp. 46-49, Jul./Aug. 1994.

Menon, "Adsorption of Mercury Vapor by Granular Activated Carbon", Master thesis, Utah State University, 1991.

Sinha and Walker, "Removal of Mercury by Sulfurized Carbons", Carbon, vol. 10, pp. 754-756, 1972.

Matsumura, "Adsorption of mercury vapor on the surface of activated carbons modified by oxidation or iodization", Atmospheric Environment, vol. 8, pp. 1321-1327, 1974.

Teller and Quimby, "Mercury Removal from Incineration Flue Gas", Proc. Annual Meeting—Air and Waste Management Association, 84th (vol. 12), 1991.

"Removal of Heavy Metals by Activated Carbon" in "Environmental Separation of Heavy Metals : Engineered Processes", CRC Press, pp. 205-264, 2001.

* cited by examiner

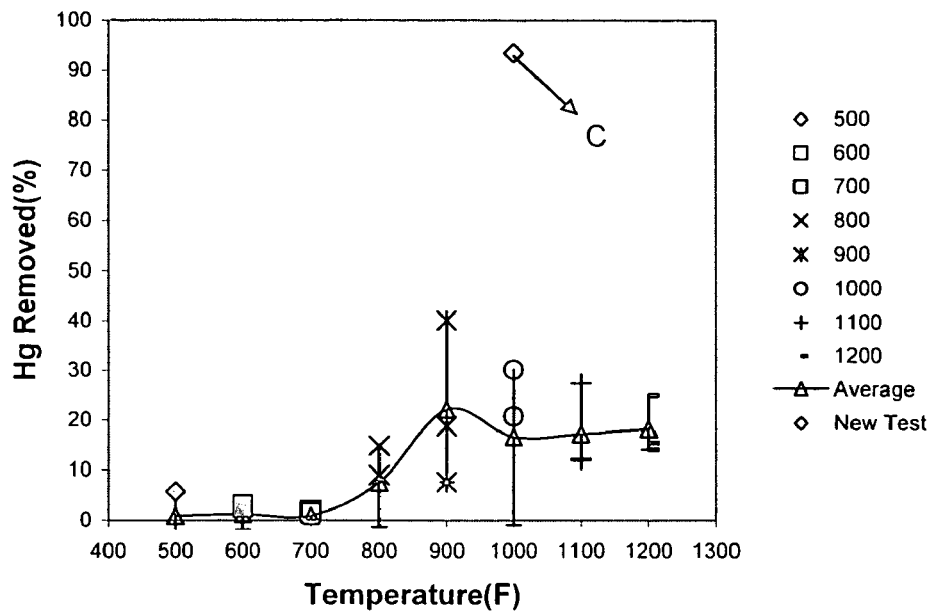
Figure 4 - -Influence of Temperature on the Hg removal
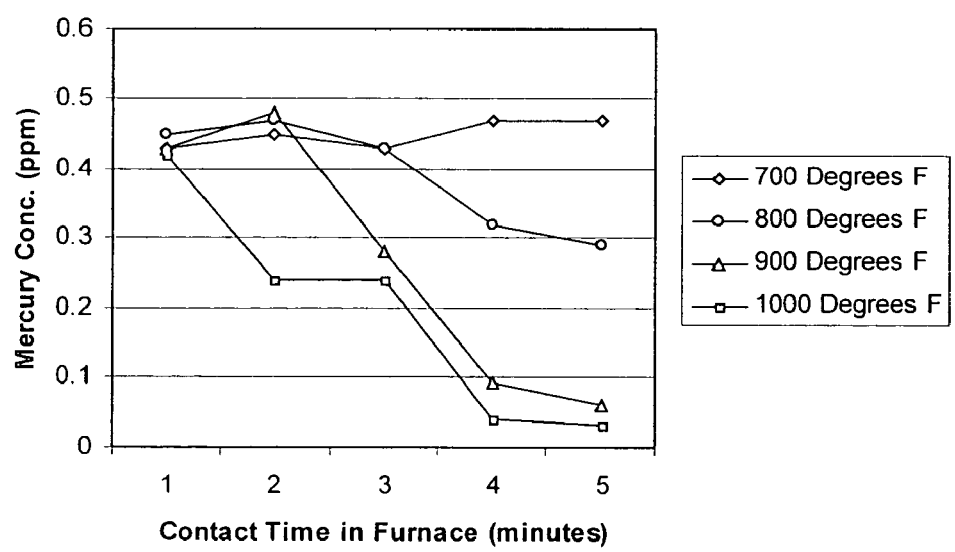
Figure 5 - Effect of detention time on mercury removal efficiency

MERCURY REMOVAL FROM ACTIVATED CARBON AND/OR FLY ASH

CROSS-REFERENCES TO RELATED APPLICATIONS

This is a continuation-in-part application of application Ser. No. 09/807,643 filed Jul. 16, 2001 now U.S. Pat. No. 6,755,901 which is a 371 of PCT/US00/22398 filed Aug. 15, 2000 which claims benefit of U.S. Provisional Patent Application No. 60/149,295 filed Aug. 17, 1999.

STATEMENT REGARDING FEDERALLY SPONSORED RESEARCH

Not Applicable.

BACKGROUND OF THE INVENTION

1. Field of the Invention

This invention relates to the treatment of a sorbent, such as activated carbon, and/or fly ash to remove mercury that contaminates the sorbent and fly ash as part of post-combustion treatments of exhaust gases from a coal-fired power plant.

2. Description of the Related Art

In 1990, the United States Environmental Protection Agency ("EPA") put into place the Clean Air Act Amendments which were designed to reduce the emissions of "greenhouse gases". Among the emissions covered are the nitrogen compounds NO and $NO_2$, referred to generically as NOx. NOx is generated through the combustion of coal and its generation is directly affected by combustion temperature, residency time, and available oxygen. Several technologies have been developed to meet the mandated NOx reduction limits. One category includes technologies that are employed after combustion has taken place. These technologies include selective non-catalytic reduction, selective catalytic reduction, and amine enhanced fuel lean gas reburn. These technologies involve adding ammonia to the exhaust gases, and a significant amount of the ammonia finds its way onto the fly ash, typically by combining with available sulfur and other compounds that attach to the ash particles.

Fly ash is a marketable product if it is not contaminated. The ash may be used, for example, in concrete products as a replacement for a portion of the cement. However, fly ash that has been treated to reduce NOx and which is contaminated either by unburned carbon or ammonia compounds is not marketable. Systems have been developed which may be used to reduce the amount of ammonia compounds affixed to fly ash. For example, PCT International Patent Publication No. WO 01/12268 describes a process for the reduction of ammonia residues from the recovered fly ash of a coal fired power plant.

In addition, the emission of mercury compounds from all sources, including coal-fired power plants, has drawn national and international attention due to the fact that certain forms of mercury have deleterious effects on wildlife and are toxic to humans. Mercury is a naturally occurring element in the environment; however, human activities over the centuries have released large quantities of this element from its sequestered forms (mercury-containing ores, soils, rocks, including all forms of coal). Currently, scientists believe that most of the mercury entering the environment results from air emissions. Large scale releases from certain mining activities (e.g. gold mining), coal burning, medical and municipal waste incineration appear to be the largest anthropogenic sources. However, natural degassing from the oceans, soils, and rocks is thought to be the largest overall source of mercury to the atmosphere.

Mercury emitted from the above sources is transported and transformed by atmospheric processes that are only partially understood. However, it is known that when the oxidized form of mercury (currently believed to constitute a very small percentage of all mercury in the atmosphere) deposits to certain aquatic systems, such as wetlands, salt marshes, and certain lakes, this form of mercury undergoes chemical transformation by certain microbes. These microbes convert the inorganic form to methylmercury, a very potent neurotoxin. While this form is typically present in very low concentrations in the environment, it can be bioaccumulated via the food chain. The mercury levels in the top members of the food chain are often present at concentrations thousands of even millions of times greater than what can be found in natural waters. These higher concentrations are found in fish or mammals that occupy the top of ecosystem food chains. Persons who eat large quantities of these fish are thought to be at risk from developing mild to severe forms of mercury poisoning. Women who eat large quantities of mercury-contaminated fish or seafood and are pregnant, run the risk of giving birth to a child who may experience learning disabilities.

The United States Environmental Protection Agency (EPA) is focusing on mercury, because mercury has been identified as a toxic of great concern among all the air toxics emitted from power plants. To reduce the risk mercury poses to people's health, the EPA is announcing that it will regulate emissions of mercury and other air toxics from coal- and oil-fired electric utility steam generating units (power plants). The data indicates that coal-fired power plants are the largest source of human-caused mercury emissions in the United States. It has been reported that the EPA is likely to propose mercury regulations by Dec. 15, 2003 and issue final regulations by Dec. 15, 2004.

Physical forms of mercury in ambient air can be divided into two categories: vapor phase, which is dominant in the atmosphere, and particulate phase (associated with aerosols), which only comprises a few percent of total airborne mercury emissions. Chemical forms determine the transport of mercury between different environmental media (air, water and soil). The mercuric compounds can be classified into elemental and divalent forms. The elemental form of mercury ($Hg^0$) is the dominant form (>98%) of vapor-phase mercury in the atmosphere, and following dissolution in cloud water or rainwater, is readily converted to more soluble mercury species. Elemental mercury possesses relatively high vapor pressure and low solubility. The former property leads to considerable mercury evaporation into the ambient air, while the latter makes it difficult for the existing air pollution control devices to remove mercury from the emission sources. Divalent mercury forms include inorganic ($Hg^{2+}$, HgO, $HgCl_2$) and organic oxidized forms ($CH_3Hg$, $CH_3HgCl$, $CH_3HgCH_3$). Divalent forms possess higher solubility and readily combine with a variety of reactants, such as sulfite, chloride and hydroxide ions, in the aqueous phase. The boiling points of elemental mercury and some mercury compounds are as follows: Hg, 356.58° C.; $HgCl_2$, 303° C.; and HgS, 580° C.

Many existing air pollution control technologies and several innovative methods have been evaluated for the control of vapor-phase mercury emissions from combustion processes. Sodium sulfide ($Na_2S$) has been used for vapor-phase mercury control in municipal solid waste combustors in Canada, Sweden, Germany and British Columbia.

Sodium sulfide injection is usually combined with dry sorbent injection and fabric filters for acid gas and particulate matter control. It has been reported that mercuric sulfide (HgS) is generated as a fine particulate in the process, which may prove difficult to capture in less efficient electrostatic precipitators. Other potential problems for this process include corrosion, hydrogen sulfide formation and chemical storage and handling. These problems, compounded by the lack of test data on full-scale coal-fired power plants, cloud the utility of sodium sulfide injection for the control of mercury emissions. (See Sengupta, "Environmental Separation of Heavy Metals: Engineered Processes", CRC Press, 2001.)

Wet scrubbers have been routinely used to remove hydrochloric acid and sulfur dioxide from the flue gases of industrial factories, coal-fired power plants and municipal waste combustors. Considerable interest in the use of wet scrubbers systems to simultaneously remove sulfur dioxide and mercury has recently been expressed. The removal of vapor-phase mercury in the wet scrubber system would also occur by absorption in the scrubbing slurry, whereby the mechanism of mercury removal depends on the solubility of mercury in the scrubbing slurry, contact time and solution chemistry. Elemental mercury is essentially insoluble in the wet scrubbing slurry, while some of the oxidized species, such as mercuric chloride, are highly soluble. Therefore, oxidized mercury can be easily absorbed with sufficient gas-liquid contact, while the removal of elemental mercury would remain limited. Chang and Owens reported that the treatment of a coal-fired power plant flue gas using only a wet scrubber allowed 70–75% of elemental mercury to be discharged into the atmosphere (see Chang and Owens, *EPRI J.*, 16, 2, 183–189,1994), while other studies reported 30–70% removal of elemental mercury by wet scrubbers. (see, Sengupta, above).

Presently, the most effective and widely used technology for capturing mercury from flue gas emissions is to inject activated carbon into the gas stream. Injected activated carbon binds the vapor-phase mercury through physical adsorption and chemisorption and is collected in downstream particulate collection devices, such as fabric filters (baghouses) or electrostatic precipitators. Results from several tests indicated that effectiveness of activated carbon injection in removing mercury vapor depends on the type and composition of burned materials, flue gas composition and temperature, mercury speciation, activated carbon properties and injection rate and operating conditions. Because activated carbon can be collected effectively in the existing particulate control devices, direct activated carbon injection has several potential advantages over wet scrubbing processes.

One method of doing this is to inject powdered activated carbon into the exhaust gas upstream of a primary particulate collector (e.g., an electrostatic precipitator or baghouse). However, when using this method, the carbon/mercury mixture is collected along with fly ash. The collected fly ash has a higher carbon content (from the activated carbon) and has increased mercury levels due to the mercury adsorbed on the activated carbon. As a result, the collected fly ash becomes unusable in concrete without beneficiation to remove the additional carbon content. Thus, the value of the resulting fly ash declines because of more limited uses and the need for expensive beneficiation techniques such as froth flotation, electrostatic separation, or reburning the fly ash. Because the primary use of fly ash includes cementitious material for concrete and concrete products, feed stock for Portland cement manufacture, liquid waste stabilization, and lightweight aggregate production, it is essential to maintain the high quality of fly ash for use in concrete. Also, mercury adsorbed by the activated carbon may increase the potential for release of mercury into the environment during reuse or landfilling of the fly ash.

Another method for capturing and removing mercury from exhaust gases involves injecting powdered activated carbon into the exhaust gas downstream of the primary particulate collector and ahead of a secondary particulate collector (e.g., an electrostatic precipitator or baghouse). The resulting carbon/mercury mixture is then collected in the secondary particulate collector for disposal. Therefore, the quality of fly ash collected in the primary particulate collector is warranted for reuse in concrete. However, the issue still remains as to what to do with the carbon/mercury mixture collected in the secondary particulate collector. As stated above, the mercury adsorbed by the activated carbon may increase the potential for release of mercury into the environment during landfilling or other disposal of the mixture. Furthermore, the expense associated with current activated carbon injection technology can be quite high due to the disposal costs associated with mercury contaminated carbon.

Therefore, there is a need for an improved method and apparatus that can remove adsorbed mercury from a sorbent, such as activated carbon, that is collected separately or collected with fly ash in an exhaust gas treatment process for a coal-fired power plant.

SUMMARY OF THE INVENTION

The foregoing needs are met by a method according to the invention for reducing the amount of mercury affixed to a sorbent. The method includes the steps of providing an amount of sorbent wherein at least a portion of the amount of sorbent has particulates having mercury compounds affixed to the particulates; and exposing the amount of sorbent to heated flowing air until mercury compounds are liberated from at least some of the particulates. Preferably, the amount of sorbent is maintained in the heated flowing air until the sorbent reaches a temperature of at least 700° F. (372° C.). When the sorbent is activated carbon, it is preferred that the amount of sorbent is maintained in the heated flowing air until the activated carbon reaches a temperature in the range of 700° F. (372° C.) to 1000° F. (538° C.).

In another aspect, the invention provides a method for reducing the amount of mercury in an amount of particulate matter including fly ash and activated carbon. The method involves providing an amount of particulate matter including fly ash and activated carbon wherein at least a portion of the fly ash or activated carbon has adsorbed mercury compounds; and exposing the amount of particulate matter to heated flowing air until mercury compounds are liberated from at least some of the particulate matter. Preferably, the particulate matter is exposed to heated flowing air until the particulate matter reaches a temperature of at least 700° F. (372° C.), and when the sorbent is activated carbon, the particulate matter is exposed to heated flowing air until the particulate matter reaches a temperature in the range of 700° F. (372° C.) to 1000° F. (538° C.).

It is therefore an advantage of the invention to provide a method for reducing the amount of mercury affixed to a sorbent, such as activated carbon.

It is another advantage of the invention to provide a method for reducing the amount of mercury affixed to particulate matter including fly ash and activated carbon.

It is yet another advantage of the invention to provide a method for reducing the amount of mercury affixed to a sorbent such that the sorbent can be reused in a mercury reduction process.

These and other features, aspects, and advantages of the present invention will become better understood upon consideration of the following detailed description, drawings, and appended claims.

BRIEF DESCRIPTION OF THE DRAWINGS

FIG. 4 is a graph showing the influence of temperature on mercury removal.

FIG. 5 is a graph showing the effect of retention time on mercury removal efficiency.

Like reference numerals will be used to refer to like or similar parts from Figure to Figure in the following description of the drawings.

DETAILED DESCRIPTION OF THE INVENTION

This invention relates to a method for reducing the amount of mercury affixed to a sorbent. The method includes the steps of providing an amount of sorbent wherein at least a portion of the amount of sorbent has particulates having mercury compounds affixed to the particulates; and exposing the amount of sorbent to heated flowing air until mercury compounds are liberated from at least some of the particulates. Preferably, the amount of sorbent is maintained in the heated flowing air until the sorbent reaches a temperature of at least 700° F. (372° C.). When the sorbent is activated carbon, it is preferred that the amount of sorbent is maintained in the heated flowing air until the activated carbon reaches a temperature in the range of 700° F. (372° C.) to 1000° F. (538° C.). After mercury compounds are liberated from at least some of the particulates, the mercury-depleted sorbent may be reused in a mercury reduction process.

The method according to the invention may be a continuous process in which an in-process temperature of the sorbent is measured when the sorbent is exposed to the heated flowing air. The sorbent being exposed to the heated flowing air is removed from the flowing air when the measured in-process temperature reaches at least 700° F. (372° C.). Thereafter, a second amount of sorbent comprising particulates having mercury affixed to the particulates is exposed to the heated flowing air until the sorbent reaches a temperature of at least 700° F. (372° C.).

The sorbent may be exposed to the heated flowing air by providing a metal media having openings; passing heated flowing air through the openings, and depositing the sorbent on the metal media. In one form, the openings are 10 microns or less. In another form, the flowing air is passed through the openings at greater than 0 to about 10 cubic feet (0.28 cubic meters) per minute. Preferably, the sorbent is preheated to a temperature of at least 300° F. (148° C.) before exposing the amount of sorbent to the flowing air.

Figure 1:
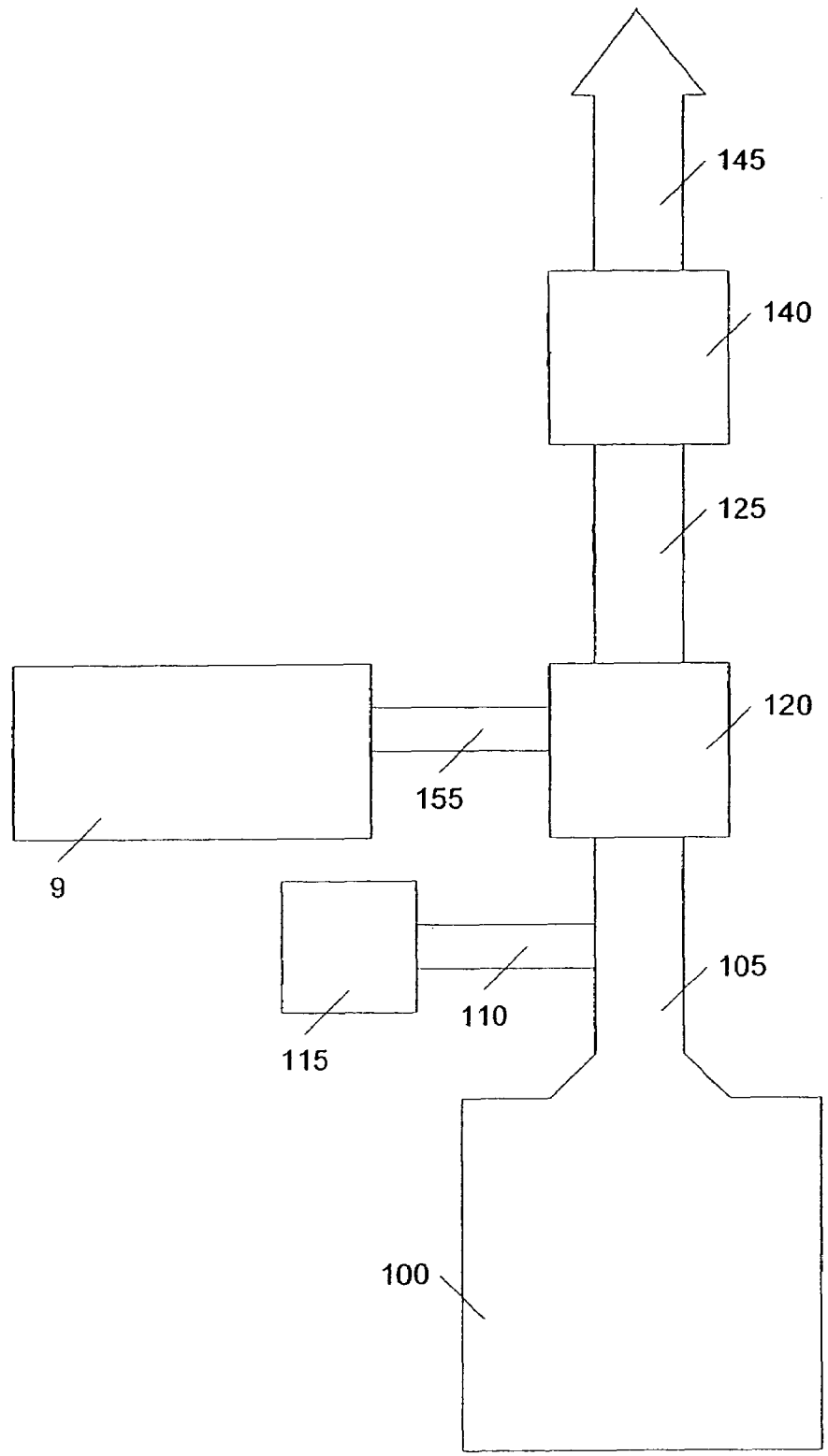
FIG. 1 is a diagrammatic illustration of an exhaust gas treatment apparatus for a coal-fired power plant.

Referring to FIG. 1, there is shown a diagrammatic illustration of an example exhaust gas treatment system for a coal-fired power plant. Components of the exhaust gas treatment system which are present in a typical system but not necessary for an understanding of the present invention have been omitted from the illustration. A combustion chamber 100 is connected to a flue 105 for directing exhaust gases away from the combustion chamber 100. A sorbent storage and injection unit 115 is connected to the flue 105 via a conduit 110 and can be any means for storing and injecting a sorbent, such as activated carbon, to be used in capturing and removing mercury from the exhaust gases. The flue 105 is also connected to a primary particulate collector 120 for collecting particulate matter from the exhaust gas in the flue 105. The particulate matter includes, among other things, fly ash (which may be contaminated with ammonia from an NOx reduction process) and sorbent, which typically includes adsorbed mercury. The particulate collector 120 can be an electrostatic precipitator or baghouse or any other means for collecting particulate matter in the exhaust gases in the flue 105.

The primary particulate collector 120 is connected via conduit 155 to a mercury removal apparatus 9, which will be described in detail below. The particulate matter collected in the primary particulate collector 120 is transferred to the mercury removal apparatus 9 via the conduit 155. Alternatively, the particulate matter collected in the primary particulate collector 120 can be transferred to the mercury removal apparatus 9 by alternative means such as loading equipment. The mercury removal apparatus 9 removes the mercury from the particulate matter collected in the primary particulate collector 120 as described below. The primary particulate collector 120 is also connected to a second flue 125 for directing the exhaust gases, after the removal of particulate matter, from the primary particulate collector 120. The second flue 125 is connected to a secondary particulate collector 140 for collecting further particulate matter from the exhaust gases from the second flue 125. The secondary particulate collector 140 can be an electrostatic precipitator or baghouse or any other means for collecting particulate matter. The secondary particulate collector 140 is also connected to a third flue 145 for directing the exhaust gases, after the removal of further particulate matter, from the secondary particulate collector 140 into the atmosphere. Alternatively, the third flue 145 could also be removed and the exhaust gases directed to the atmosphere directly from the secondary particulate collector 140.

Figure 2:
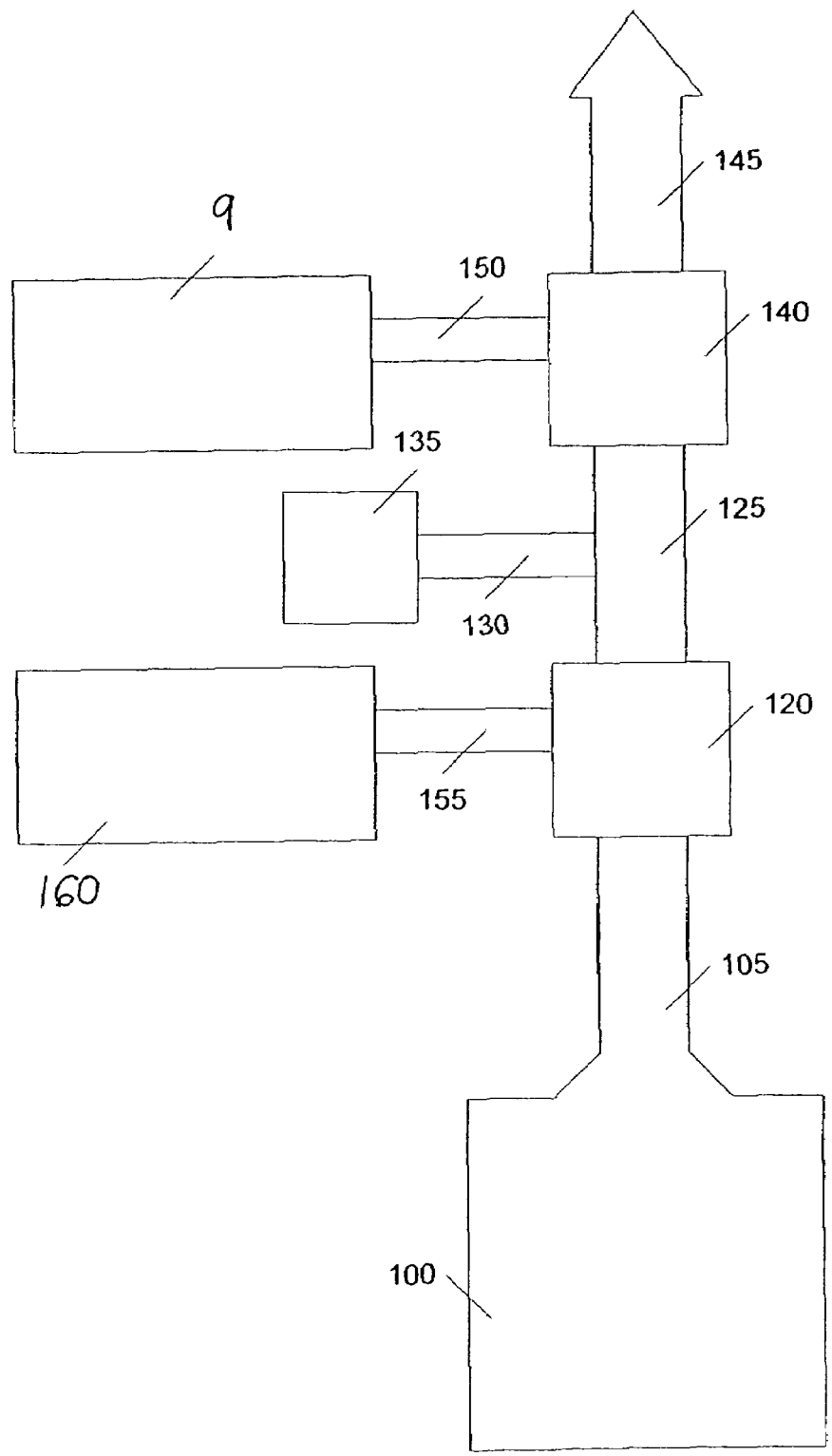
FIG. 2 is a diagrammatic illustration of another exhaust gas treatment apparatus for a coal-fired power plant.

Referring now to FIG. 2, there is shown a diagrammatic illustration of another example exhaust gas treatment system for a coal-fired power plant. Components of the exhaust gas treatment system which are present in a typical system but not necessary for an understanding of the present invention have been omitted from the illustration. Like reference numerals will be used to refer to like or similar components in FIG. 1 and FIG. 2. A combustion chamber 100 is connected to a flue 105 for directing exhaust gases away from the combustion chamber 100. The flue 105 is connected to a primary particulate collector 120 for collecting particulate matter from the exhaust gas in the flue 105. The particulate matter includes, among other things, fly ash (which may be contaminated with ammonia from an NOx reduction process). The particulate collector 120 can be an electrostatic precipitator or baghouse or any other means for collecting particulate matter in the exhaust gases in the flue 105. The primary particulate collector 120 is connected to a particulate storage unit 160 via conduit 155 so that particulate matter can be stored after collection in the primary particulate collector 120. Alternatively, the particulate matter collected in the primary particulate collector 120 can be transferred to the particulate storage unit 160 by alternative means such as loading equipment.

The primary particulate collector 120 is also connected to a second flue 125 for directing the exhaust gases, after the removal of particulate matter, from the primary particulate collector 120. A sorbent storage and injection unit 135 is connected to the second flue 125 via a conduit 130 and can be any means for storing and injecting a sorbent, such as activated carbon, to be used in capturing and removing mercury from the exhaust gases in the second flue 125. The second flue 125 is also connected to a secondary particulate collector 140 for collecting further particulate matter from the exhaust gases from the second flue 125. The particulate matter collected in the secondary particulate collector 140 includes, among other things, sorbent, which typically includes adsorbed mercury. However, depending on the level of mercury in the exhaust gases, a portion of the sorbent collected may not include any adsorbed mercury. The secondary particulate collector 140 can be an electrostatic precipitator or baghouse or any other means for collecting particulate matter.

The secondary particulate collector 140 is connected via conduit 150 to a mercury removal apparatus 9 as described below. The particulate matter collected in the secondary particulate collector 140 is transferred to the mercury removal apparatus 9 via the conduit 150. Alternatively, the particulate matter collected in the secondary particulate collector 140 can be transferred to the mercury removal apparatus 9 by alternative means such as loading equipment. The mercury removal apparatus 9 removes the mercury from the particulate matter collected in the secondary particulate collector 140. The secondary particulate collector 140 is also connected to a third flue 145 for directing the exhaust gases, after the removal of particulate matter, from the secondary particulate collector 140 into the atmosphere. Alternatively, the third flue 145 could also be removed and the exhaust gases directed to the atmosphere directly from the secondary particulate collector 140.

Figure 3:
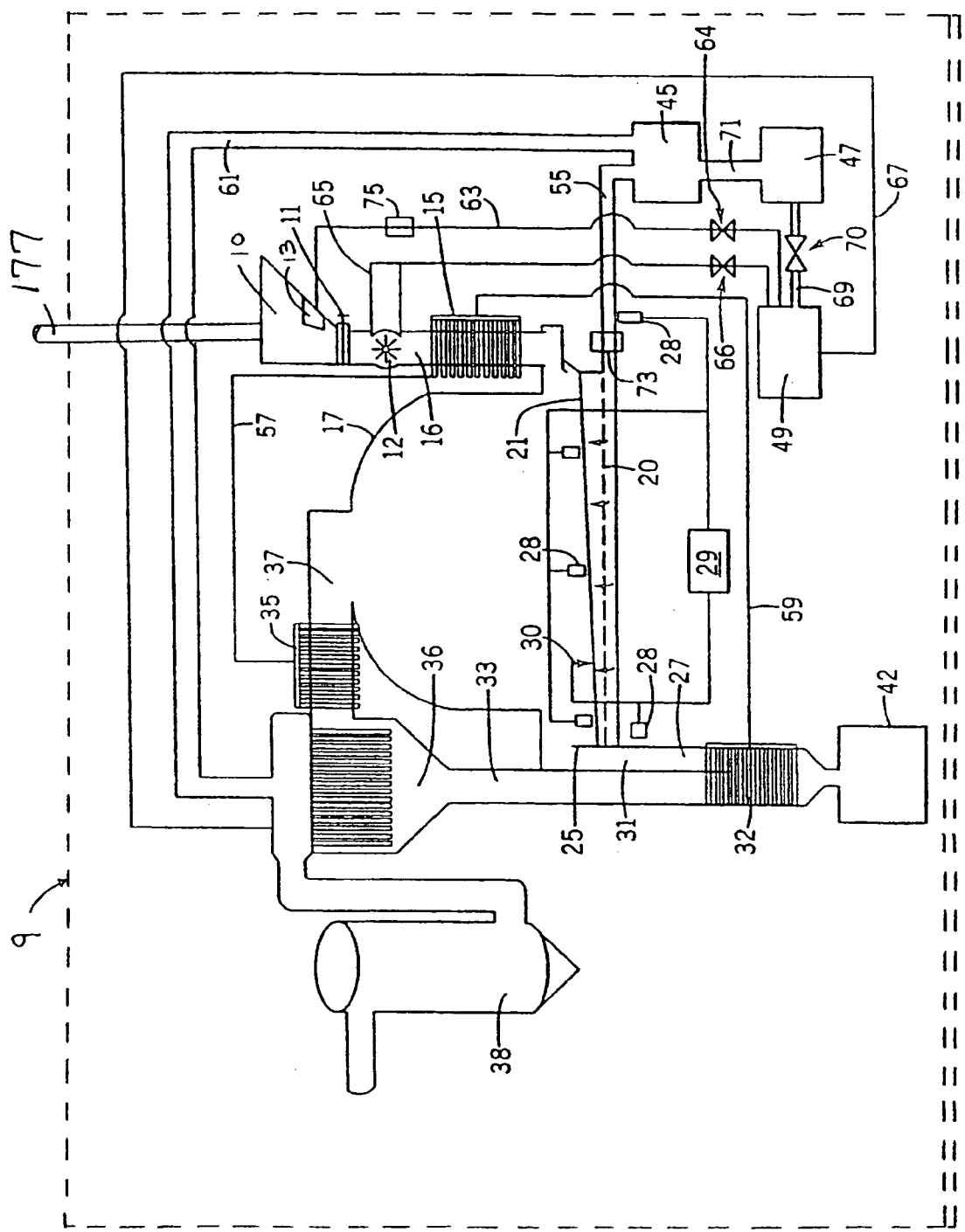
FIG. 3 is a diagrammatic illustration of an embodiment of an apparatus for removal of mercury from a sorbent such as activated carbon.

Referring to FIG. 3, there is shown in more detail the mercury removal apparatus, indicated generally at 9, for removal of mercury from (i) the particulate matter collected in the primary particulate collector 120 in FIG. 1 (which includes fly ash and sorbent having adsorbed mercury, and/or (ii) the particulate matter collected in the secondary particulate collector 140 in FIG. 2 (which includes sorbent having adsorbed mercury). The mercury removal apparatus 9 includes a storage unit 10 that holds (i) the particulate matter collected in the primary particulate collector 120 in FIG. 1 and delivered to the storage unit 10 via conduits 155 and 177, and/or (ii) the particulate matter collected in the secondary particulate collector 140 in FIG. 2 and delivered to the storage unit 10 via conduits 150 and 177. Thus, when describing the particulate matter treated in the mercury removal apparatus 9, it should be understood that the particulate matter can be a mixture of one or more of any of the following: fly ash, fly ash contaminated with ammonia, fly ash having adsorbed mercury, sorbent, sorbent having adsorbed mercury, and other particulate matter.

The storage unit 10 may be a standard storage silo, preferably configured with sufficient height to allow for gravity feed. A maintenance gate 11 closes the bottom of the storage unit 10 to halt the flow of the particulate matter for maintenance of the equipment downstream. The storage unit 10 may be replaced by a feed directly from the primary particulate collector 120 and/or secondary particulate collector 140. The storage unit 10 may have insulated walls or may include aeration stones 13 which receive air from an air supply unit 49 via conduit 63 (having pressure gauge 75 and inline valve 64) for aeration of the particulate matter with heated air.

The particulate matter is fed from the storage unit 10 through a rotary air lock in the form of a high temperature rotary feeder 12. The rotary feeder 12 receives air from the air supply unit 49 via conduit 65 with an inline valve 66 that assists in maintaining a steady feed and depth of the particulate matter to a preheating section which includes a preheater 15. A suitable rotary feeder is available from Delta/Ducon Conveying Technology, Inc., Malvern, Pa., USA. The particulate matter flows through conduit 16 wherein preheater 15 preheats the particulate matter using a bulk flow heat exchanger in the form of a series of vertical plates. The plates of the preheater 15 receive heat from a bulk flow heat exchanger 32 via conduit 59 and from a heat recovery unit 35 via conduit 57 as will be described further below. The preheater 15 serves to preheat the particulate matter to a temperature of at least 300° F. (148° C.).

The preheated particulate matter is fed into an insulated heating chamber 17 either as a batch or continuous process. The insulated heating chamber 17 includes a treatment bed with a downwardly sloping floor 20 formed of a porous metal material, preferably an alloy sold under the designation "Inconel 600". Either a vibratory feeder or a rotary vane feeder may be used to deposit the preheated carbon/mercury mixture onto the floor 20. A vibratory feeder is preferred due to its economy of operation and high heat applicability. Hot air is passed through the porous metal material of the floor 20 to provide both heat and fluidization to move the particulate matter deposited on the floor 20. The result is a fluidized bed conveyor 21. A suitable fluidized bed conveyor is available as an air slide from Delta/Ducon Conveying Technology, Inc., Malvern, Pa., USA. The porous metal media that supports the carbon/mercury mixture bed may be 0.062 inches (1.57 millimeters) thick and preferably has openings of 10 microns or less. A suitable porous metal media is available from Mott Metallurgical Corporation of Farmington, Conn., USA.

The heated air is passed through the porous metal media of the floor 220 to provide for uniform aeration and heating of the particulate matter bed. The hot aeration air is provided such that a minimum of particles are carried out of the treatment area. This is accomplished through the design of the porous media sizing, the aeration air pressure and the air temperature. The heated air is passed through the particulate matter bed at a specific flow rate which is designed to maximize the heat uptake by the particulate matter and provide for the removal of mercury compounds from the particulate matter. The same aeration air provides the fluidization to move the particulate matter through the heating chamber in a continuous process or to move the particulate matter out of the chamber in a batch system.

The hot air passed through the floor 20 may come from a direct fired natural gas burner, oil fired burner, electrical heat source, or waste heat source, such as the waste heat of a combustion turbine. In the apparatus of FIG. 3, the hot air passed through the floor 20 comes via a conduit 55 from a gas furnace 45 that receives preheated air from an air preheater 47 via a conduit 71. The air preheater 47 receives air from the air supply unit 49 (such as a compressor) via a conduit 69 with an inline valve 70 that controls the flow of air into the air preheater 47. A programmable logic controller 29 receives signals from a pressure gauge 73 in the conduit 55 and provides control signals to inline valve 70 in order to control air flow into the air preheater 47 and the gas furnace 45. Preferably, the hot air is supplied to the floor 20 from the gas furnace 45 at a pressure from greater than 0 to about 3 psi (0.0207 MPa). At these pressures, the metal media will pass heated air into the particulate matter on the fluidized bed conveyor 21 at approximately 0 to about 10 cubic feet (0.28 cubic meters) per minute. One advantage to using flowing air is that more rapid heating of the particulate matter and a resulting faster release of mercury occurs. Mercury is liberated from the particulate matter by heats of at least 700° F. (372° C.), and when the sorbent is activated carbon, it is preferred that the mercury be liberated from the particulate matter by heats in the range of 700° F. (372° C.) to 1000° F. (538° C.). The mercury is carried away from the particulate matter by the air. The liberating air also provides the motive force or fluidization that allows the particulate matter to move within the treatment bed.

The particulate matter should be retained on the fluidized bed conveyor 21 until it reaches a minimum temperature of 700° F. (372° C.). A blocking means such as a weir or a dam 25 is used to retain the particulate matter in the insulated heating chamber 17. As the particulate matter is fed into the beginning of the fluidized bed conveyor 21, the fluidized particulate matter level rises. As the particulate matter level rises, the mercury-depleted particulate matter at the exit area spills over the weir or dam 25 and drops through conduit 31 into a heat recovery zone 27. A series of thermocouples 28 in electric communication with the programmable logic controller 29 may be used to control the inline valve 66 that controls air input to the rotary feeder 12 to control particulate matter input to the insulated heating chamber 17 in response to the measured particulate matter exit temperature. As the target temperature is reached by the particulate matter, more particulate matter is fed into the fluidized bed conveyor 21 via the rotary feeder 12. The programmable logic controller 29 uses data from the thermocouples 28 and a level probe 30 to monitor and control heat exchange rates, to control particulate matter feed rates from the rotary feeder 12, to control treatment bed air flow from the gas furnace 45 (by control of inline valve 70) and to monitor particulate matter temperatures within the system.

An alternative to using a weir or dam 25 as the particulate matter outflow blocking means is the use of a gate to retain particulate matter in the insulated heating chamber 17. As the particulate matter in the insulated heating chamber 17 reaches the designated temperature as determined by the thermocouples 28 in electrical communication with the programmable logic controller 29, the programmable logic controller 29 causes the gate to raise allowing a portion of mercury-depleted particulate matter to exit the fluidized bed conveyor 21. The programmable logic controller 29 also causes particulate matter to be fed into the fluidized bed conveyor 21 via rotary feeder 12. The use of a gate mechanism aids in preventing incoming particulate matter from short circuiting the fluidized bed conveyor 21, allowing only heated particulate matter from the bottom of the particulate matter bed and in close contact with the incoming hot air, to exit the insulated heating chamber 17.

The heat recovery zone 27 is equipped with a bulk flow heat exchanger 32 which transfers heat from the mercury-depleted particulate matter to the plates of the preheater 15 via conduit 59 as described above. The mercury-depleted particulate matter leaving the system is cooled and may possibly be reused in the mercury removal process. The upper portion of the insulated heating chamber 17 is domed to provide a static pressure area. The gases from the insulated heating chamber 17 pass through conduit 37 into a heat recovery unit 35 in the form of a heat exchanger which transfers heat from the gases to the plates of the preheater 15 via conduit 57 as described above. The heat recovery unit 35 cools the gases and provides heat to the particulate matter in the pretreatment area via preheater 15. After passing through the heat recovery unit 35 the gas and entrained mercury-depleted particulate matter then passes to a high temperature baghouse 36, which receives heat from the gas furnace 45 via conduit 61, operated at a temperature to ensure that the mercury remains in a gaseous state thereby inhibiting reformation and deposition of the mercury on the particulate matter and equipment surfaces. The high temperature baghouse 36 receives air from the air supply unit 49 via conduit 67 and captures fugitive particles, and the mercury-depleted particulate matter collected by the high temperature baghouse 36 is transferred via conduit 33 to the heat recovery zone 27 where the bulk flow heat exchanger 32 transfers heat from the mercury-depleted particulate matter to the plates of the preheater 15 via conduit 59 as described above. After passing through the bulk flow heat exchanger 32, the mercury-depleted particulate matter is transferred to a storage unit 42. The mercury-depleted particulate matter leaving the system is cooled and can, under certain circumstances, be reused in the mercury removal process. The remaining gaseous mercury also exits the high temperature baghouse 36 and may be transferred to a mercury condenser.

EXAMPLE

The following Example has been presented in order to further illustrate the invention and is not intended to limit the invention in any way.

A. Overview

The experiments described in this example focus on the liberation of mercury from a blend of activated carbon and fly ash. In the laboratory, the samples were heated up under the various temperatures from 260° C. to 649° C. (from 500° F. to 1200° F.) and the general desorption trend curves showed that more mercury can be removed with higher temperature and longer treatment of time. In the laboratory conditions, 80% of mercury can be liberated when the heating time is set to 5 minutes. A pilot study on several different samples was carried out afterwards. The mercury liberation efficiency and mass balance were analyzed in detail. The liberation efficiency for these samples collected under the air slide ranged from 74.44% to 85.57% separately.

B. Background

Several factors may influence the adsorption and desorption of mercury by activated carbon. The adsorption ability of untreated activated carbon can be affected by temperature as demonstrated by the work of other researchers. Lowering the flue gas temperature from 345° F. to 250° F. with direct injection of virgin activated carbon was shown to improve mercury removal efficiency from 0% to 37%. Further tests showed that virgin activated carbon injection at 200° F. resulted in greater than 90% mercury removal (See, Sengupta, above.) Results from several tests indicated that effectiveness of activated carbon injection in removing mercury vapor also depends on the type and composition of burned materials, flue gas composition and temperature, mercury speciation, activated carbon properties and injection rate and operating conditions (See, Menon, "Adsorption of Mercury Vapor by Granular Activated Carbon", Master thesis, Utah State University, 1991).

Because oxygen is readily chemisorbed by activated carbon to form carbon-oxygen complexes that are important in determining surface reactions and adsorptive behavior, it is necessary to study the possibility of carbon-oxygen complex formation during the tests conducted in the presence of oxygen and their impact on mercury removal. In a set of experiments, adsorption capacity in a variety of oxygen concentrations was tested and the test results are listed as Table 1 below. It shows that the oxygen can enhance the adsorption of mercury into the activated carbon.

TABLE 1

Effect of oxygen on the adsorption capacity of activated carbon

| Concentrations ($O_2$) | 0% to 3% | 6% and 9% |
|---|---|---|
| Adsorption Capacity | Unchanged | 16 and 32% |

In another series of experiments done upon SIAC (sulfur-impregnated activated carbon), the effect of $CO_2$ on the adsorption capacity was examined. When the concentration of $CO_2$ was increased from 5% to 15%, identical breakthrough curves were obtained, which indicated that $CO_2$ behaves like an inert gas and does not affect the performance of SIAC (see, Sengupta, above).

Sinha and Walker reported that sulfur-impregnated carbon exhibits faster initial breakthrough at room temperature than the virgin activated carbon due to the reduction in surface area induced by the impregnation process (see, Sinha and Walker, Carbon 10:754–756, 1972). However, at higher temperatures (302° F.), the adsorptive capacity of sulfur-impregnated carbon greatly surpassed the capacity of virgin activated carbon due to chemisorptions of mercury and formation of mercuric sulfide (see, Sengupta, above.) Furthermore, they reported that water vapor reduces adsorption of mercury for sulfur-impregnated carbon.

Matsumura used steam-activated carbon surface on the removal efficiency for mercury vapor (see, Matsumura, "Adsorption of mercury vapor on the surface of activated carbons modified by oxidation or iodization", *Atmospheric Environment*, 8:1321–1327,1974.) He concluded that oxidized or iodized activated carbon adsorbed mercury vapor 20–60 times more than untreated activated carbon when exposed to mercury vapor in concentrations of up to 40 $mg/m^3$ in a nitrogen stream at 86° F. Oxidized carbons were successfully regenerated with hydrochloric acid. Iodized activated carbons were shown to be suitable adsorbents for mercury vapor though adsorbed mercury was not proportional to the amount of iodine adsorbed on the carbon.

Teller and Quimby evaluated the performance of activated carbon impregnated with copper chloride or sulfur for the removal of mercury under the conditions representative of solid waste incinerators (see, Teller and Quimby, "Mercury Removal from Incineration Flue Gas", Somerville, N.J.: Air and Water Technologies, Co, 1991.) They concluded that moisture content of the carrier gas and temperatures tested in their study had no effect on the copper chloride-impregnated carbon's capacity for mercury removal. They also concluded that as the impregnate concentration increases (for copper chloride), mercury removal increases, but they were not able to correlate these two parameters. They observed that copper chloride-impregnated carbon exhibits as much as 300 times higher capacity for mercury removal as compared to untreated activated carbon. Sulfur-impregnated carbon exhibited only a 60% improvement in the breakthrough time.

While all these factors can influence the absorption of mercury by activated carbon, the effects of temperature and content of $O_2$ were tested in the laboratory tests and pilot studies.

C. Experiments

Bench scale experiments were conducted to evaluate the mercury recovery rate from activated carbon under various operating conditions. Since adsorption is an exothermal process, it is expected the adsorptive capacity of activated carbon will decrease significantly as temperature increases, which means higher mercury recovery rate. In the meantime, carbon loss is likely to increase considerably as temperature goes up. Thus, it is essential to select an optimum combination of temperature and detention time, that takes into consideration both the mercury recovery rate and carbon regeneration rate.

Samples containing both activated carbon sorbent and fly ash were taken from the Presque Isle Power Plant (PIPP) of Wisconsin Electric Power Company, Wisconsin, USA and used in the bench scale studies. The mercury concentration in the sample before the thermal treatment was 0.512 ppm. Samples were treated under different temperatures ranging from 500° F. to 1200° F. (from 260° C. to 649° C.) in an oven for 5 to 6 seconds. The tests were done in a pure nitrogen environment. FIG. 4 shows the efficiency of mercury desorption from the activated carbon and fly ash mixture as the temperature increases. Mercury started to be liberated from the samples at around 700° F. and the mercury removal efficiency stayed around 30% from 900° F. to 1200° F. The retention time of 5 to 6 seconds was chosen to preserve as much carbon as possible. An 80% removal efficiency was obtained at 1100° F. after the sample retention time was lengthened to 5 minutes as shown at point C in FIG. 4. However, it was suspected that most of the carbon was lost during the elongated heating process. Since the retention time plays an important role on the treatment process, another set of bench scale experiments were carried out to test the effect of retention time on mercury removal efficiency. In these experiments, samples from PIPP, with an original mercury concentration of 0.42 ppm, were heated in the pure nitrogen gas filled oven for retention times ranging from one to five minutes. The operating temperature of the oven varied from 700° F. to 1000° F. As shown in FIG. 5, more mercury can be removed with higher temperature and longer treatment.

Based upon the test results obtained from the bench scale experiments, a test program was designed to generate experimental data from a pilot scale apparatus according to the invention. Four batches of samples from three different power plants were tested. These samples were obtained from Presque Isle Power Plant (PIPP) of Wisconsin Electric Power Company, Wisconsin, USA, the Valley Power Plant (VAPP) of Wisconsin Electric Power Company, Wisconsin, USA, and the Pleasant Prairie Power Plant (PPPP) of Wisconsin Electric Power Company, Wisconsin, USA. Table 2 lists the analysis results for these samples:

TABLE 2

|  |  | Experiment Sequence | | | | |
|---|---|---|---|---|---|---|
|  |  | 1st | 2nd | 3rd | 4th | |
| Sample Description | | PIPP | PPPP | VAPP | PIPP(1) | PIPP(2) |
| Samples collected before Experiment | Hg Content (ppm) | 0.18 | 0.97 | 0.20 | 0.17 | 0.15 |
|  | Loss on ignition (%) | 26.7 | 3.2 | 33.5 | 25.0 | 21.7 |
| Samples collected under the air slide | Hg content (ppm) | 0.046 | 0.14 | 0.031 | 0.18 | 0.031 |
|  | Hg Removed (%) | 74.44 | 85.57 | 84.50 | −5.88 | 79.33 |
|  | Loss on Ignition (%) | 38.1 | 9.8 | 36.9 | 33.5 | 26.1 |
| Samples collected under the Bag house | Hg content (ppm) | 0.38 | 1 | 0.38 | 0.32 | 0.32 |
|  | Hg Increased (%) | 111.11 | 3.09 | 90.00 | 88.24 | 113.33 |
|  | Loss on Ignition (%) | 22.6 | 10.5 | 26.9 | 27.4 | 22.0 |

Before the test, the initial temperature for the inlet of the air slide is 1000° F. Loss on Ignition is used to measure the carbon content in the samples, where we assume that all the loss of the mass is due to carbon combustion.

For the first 3 runs of the experiment, since the mercury concentration for the samples collected under the slide decreased from the initial concentration, we can assume that mercury has been separated from the fly ash. However, we noticed that the mercury content for those samples collected under the bag house become even higher. This might be due to the lower temperature of the bag house, which is cooled down by the cooling water that flows through.

Under this consideration, in the last experiment, the cooling water was cut off to increase the temperature of the bag house. We had expected lower concentrations of mercury in both collectors under the air slide and the bag house. However, in the 4th run of the test, we got the abnormal results as shown in the Table 3. One possible explanation is that the sample collected under the air slide was contaminated by the samples from VAPP, which was tested before the 4th run.

For the first 3 runs of the tests, cooling water was used to cool down the baghouse. According to recorded data, the highest temperature for the baghouse of among these tests was around 300° F. The baghouse temperature was increased to 600° F. in the 4th comparison test, assuming more mercury could be liberated from the sample at a higher temperature. We noticed that for sample PIPP, the mercury removal efficiency for the sample below the air slide increased from 74.44% to 79.33, while the mercury content for the sample collected under the baghouse jumped from 111.11% to 113.33%. This is inconsistent with the original assumption that the higher temperature in the baghouse will liberate more mercury. On the other hand, it further proves the explanation that some part of mercury desorbed under the airside was reabsorbed onto the sample under the baghouse.

For the last two experiments, the weights of the samples were recorded to calculate the mass balance of mercury.

TABLE 3

Recorded weights of all samples

|  |  | Sample's Weight (lb) | |
|---|---|---|---|
|  |  | VAPP (3rd run) | PIPP (4th run) |
| Before the test (Total) | | 16.5 | 18.9 |
| After the test | Under the slide | 14.5 | 9.9 |
|  | Under the bag house | 4.3 | 1.64 |

Table 4 shows the mass balance analysis on mercury and carbon for the VAPP sample:

TABLE 4

|  | Sample weight (lb) | Hg content (ppm) | Total Hg ($10^{-6}$ lb) |
|---|---|---|---|
| Before the test | 16.5 | 0.20 | 3.3 |
| Under the air slide | 14.5 | 0.031 | 0.4495 |
| Under the bag house | 4.3 | 0.38 | 1.634 |

$$\text{Mercury desorbed} = (\text{Total Mercury before the test}) -$$
$$(\text{Total mercury under the air slide} +$$
$$\text{Total mercury under the bag house})$$
$$= (3.3 - (0.4495 + 1.634)) \times 10^{-6} \text{ lb}$$
$$= 1.2165 \times 10^{-6} \text{ lb}$$

$$\begin{aligned}\text{Percentage of mercury removed} &= \frac{\text{Mercury desorbed (lb)}}{\text{Total Mercury content before the test (lb)}} \times 100\% \\ &= \frac{1.2165 \times 10^{-6} \text{lb}}{3.3 \times 10^{-6} \text{lb}} \times 100 \\ &= 36.86\%\end{aligned}$$

TABLE 5

|  | Sample's weight (lb) | Loss on Ignition (%) | Total Carbon (lb) |
|---|---|---|---|
| Before the test | 16.5 | 33.5 | 5.5275 |
| Under the air slide | 14.5 | 36.9 | 5.3505 |
| Under the bag house | 4.3 | 26.9 | 1.1567 |

The temperature change for the system was recorded by a data logger and a laptop. Five thermal couples were installed in the system. They are connected to the burner; bag house; and inlet, midway and outlet of the air slide. The temperature changes for the test on the PIPP sample are shown in FIG. 6. A temperature drop (Point A) was observed at the air slide as sample was fed into the system.

Thus, there has been provided a method and apparatus for removing adsorbed mercury from a sorbent, such as activated carbon, collected separately or collected with fly ash in the exhaust gas treatment process in a coal-fired power plant.

Although the present invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A method for reducing the amount of mercury affixed to a sorbent, the method comprising:

providing an amount of sorbent, at least a portion of the amount of sorbent comprising particulates having mercury compounds affixed to the particulates;

depositing the amount of sorbent on a floor of a fluidized bed conveyor, the floor comprising a metal media having openings;

passing heated flowing air through the openings to move the amount of sorbent from a beginning to an exit area of the fluidized bed conveyor;

measuring an in process temperature of the sorbent when the sorbent is exposed to the heated flowing air;

removing at least a portion of the sorbent being exposed to the heated flowing air when the measured in process temperature reaches a temperature in the range of 700° F. to 1000° F.;

thereafter providing a second amount of sorbent, at least a portion of the second amount of sorbent comprising particulates having mercury affixed to the particulates; and thereafter maintaining the sorbent in the heated flowing air until the sorbent reaches a temperature in the range of 700° F. to 1000° F., wherein the fluidized bed conveyor is an air slide.

2. The method of claim 1 wherein:
the openings are 10 microns or less.

3. The method of claim 1 wherein:
the flowing air is passed through the openings at greater than 0 to about 10 cubic feet per minute.

4. The method of claim 1, wherein the sorbent is activated carbon.

5. The method of claim 1, further comprising:
reusing the sorbent in a mercury reduction process after mercury compounds are liberated from at least some of the particulates.

6. The method of claim 1 further comprising:
preheating the amount of sorbent to a temperature of at least 300° F. before exposing the amount of sorbent to the flowing air.

7. A method for reducing the amount of mercury adsorbed to activated carbon, the method comprising:

providing an amount of activated carbon, at least a portion of the activated carbon having adsorbed mercury compounds;

depositing the amount of activated carbon on a floor of a fluidized bed conveyor, the floor comprising a metal media having openings; and passing heated flowing air through the openings to move the amount of activated carbon from a beginning to an exit area of the fluidized bed conveyor;

measuring an in process temperature of the activated carbon when the activated carbon is exposed to the heated flowing air;

removing at least a portion of the activated carbon being exposed to the heated flowing air when the measured in process temperature reaches a temperature in the range of 700° F. to 1000° F.;

thereafter providing a second amount of activated carbon, at least a portion of the second amount of activated carbon having adsorbed mercury compounds; and thereafter maintaining the activated carbon in the heated flowing air until the activated carbon reaches a temperature in the range of 700° F. to 1000° F., wherein the fluidized bed conveyor is an air slide.

8. The method of claim 7 wherein:
the openings are 10 microns or less.

9. The method of claim 7 wherein:
the flowing air is passed through the openings at greater than 0 to about 10 cubic feet per minute.

10. The method of claim 7, further comprising:
reusing the activated carbon in a mercury reduction process after mercury compounds are liberated from at least some of the activated carbon.

11. The method of claim 7 further comprising:
preheating the amount of activated carbon to a temperature of at least 300° F. before exposing the amount of activated carbon to the flowing air.

12. A method for reducing the amount of mercury in an amount of particulate matter including fly ash and activated carbon, the method comprising:

providing an amount of particulate matter including fly ash and activated carbon, at least a portion of the fly ash or activated carbon having adsorbed mercury compounds;

depositing the amount of particulate matter on a floor of a fluidized bed conveyor, the floor comprising a metal media having openings; and passing heated flowing air through the openings to move the amount of particulate matter from a beginning to an exit area of the fluidized bed conveyor;

measuring an in process temperature of the particulate matter when the particulate matter is exposed to the heated flowing air;

removing at least a portion of the particulate matter being exposed to the heated flowing air when the measured in process temperature reaches a temperature in the range of 700° F. to 1000° F.;

thereafter providing a second amount of particulate matter including fly ash and activated carbon, at least a portion of the fly ash or activated carbon having adsorbed mercury compounds; and thereafter maintaining the second amount of particulate matter in the heated flowing air until the activated carbon reaches a temperature in the range of 700° F. to 1000°F., wherein the fluidized bed conveyor is an air slide.

13. The method of claim 1 wherein:
the floor is sloping.

14. The method of claim 7 wherein:
the floor is sloping.

15. The method of claim 12 wherein:
the floor is sloping.

* * * * *